United States Patent [19]

Miyazono et al.

[11] Patent Number: 5,759,435
[45] Date of Patent: Jun. 2, 1998

[54] MAGNETITE PARTICLES AND PROCESS FOR PRODUCTION THEREOF

[75] Inventors: Takeshi Miyazono; Hiroyuki Watanabe; Masachika Hashiuchi, all of Tamano, Japan

[73] Assignee: Mitsui Mining & Smelting Company, Ltd., Japan

[21] Appl. No.: 857,638

[22] Filed: May 16, 1997

[30] Foreign Application Priority Data

May 23, 1996 [JP] Japan .................................... 8-128251
Jul. 11, 1996 [JP] Japan .................................... 8-181846

[51] Int. Cl.$^6$ .................................. C04B 35/26; C01G 49/08
[52] U.S. Cl. ........................ 252/62.59; 428/403; 428/404; 252/62.56
[58] Field of Search ...................... 252/62.59, 62.56; 428/403, 404

[56] References Cited

U.S. PATENT DOCUMENTS 5,356,712 10/1994 Hashiuchi et al. ...................... 428/404

OTHER PUBLICATIONS

Chemical Abstract citation 105:195450; abstract for JP 61-124502 Jun. 12, 1986.

*Primary Examiner*—Melissa Bonner
*Attorney, Agent, or Firm*—Bierman, Muselian and Lucas

[57] ABSTRACT

Magnetite particles containing a silicon component inside, and having the silicon component exposed on the surface in a proportion of 0.05 to 2.0% by weight as silicon which have improved moisture resistance as indicated by moisture content of magnetite (% by weight), measured under high-temperature, high-humidity conditions (200° C., Karl Fischer technique), and given by the equation (1)

$$\text{moisture content (\% by weight)} \leq 0.5 + A/2 \qquad (1),$$

where A represents the amount (% by weight) of presence of the silicon component, expressed in terms of silicon, contained in magnetite, i.e., the total amount (% by weight) of silicon in magnetite, provided that $0.3 \leq A \leq 3.0$;

an electrical resistance of $1 \times 10^3$ $\Omega$·cm or more; a degree of aggregation of 40 or less; and low residual magnetization whereby the particles are excellent in operating efficiency, flowability and environmental resistance, without lowering the electrical resistance compared with the current standard.

5 Claims, No Drawings

MAGNETITE PARTICLES AND PROCESS FOR PRODUCTION THEREOF

BACKGROUND OF THE INVENTION

1. Field of the Invention

The present invention relates to magnetite particles and a process for producing them. More particularly, the invention relates to magnetite particles having a silicon component both within and on the surface of the particles, especially, magnetite particles in which the amount of presence of the silicon component (the amount expressed in terms of silicon) exposed on the surface of the particles is controlled, and which have been heat-treated in an inert gas or a fluorine-derived gas. Thus, the resulting particles are well balanced in the properties, such as electrical resistance, residual magnetization, and flowability. They also exhibit excellent environmental resistance, and find main use as starting powders for magnetic toners for electrostatic copying, and as black pigment powders for paints. The invention also concerns a process for producing such magnetite particles.

2. Description of the Related Art

Recently, magnetite particles produced by a reaction in an aqueous solution have found wide use as a magnetic toner material for dry electrophotographic copiers or printers. Various general development characteristics are required of the magnetic toner. With the progress of electrophotographic technologies in recent years, rapid advances have been made, particularly in copiers and printers employing digital techniques. Thus, the properties required have become more advanced.

In detail, outputs such as graphics or photographs have also been required in addition to conventional character outputs. Among the printers, in particular, those capable of printing 400 dots or more per inch have appeared, making latent images on the photoconductor even more meticulous. Thus, there is an intense demand for high reproducibility of thin lines by development.

To fulfill these requirements, a demand is growing for magnetite particles with well balanced residual magnetization and electrical resistance which, if possible, is high.

In a disclosure of magnetic toners made, for example, in Japanese Laid-Open Patent Publication No. 100474/92, magnetic iron oxide particles are described as still requiring an improvement in environmental resistance. As disclosed in this publication, the advent of a magnetic powder is desired which not only possesses the required properties for production of a toner, but is also excellent in environmental resistance (moisture resistance).

As magnetite particles that fulfill those requirements, Japanese Laid-Open Patent Publication Nos. 155223/86 and 278131/87, for instance, disclose magnetite particles containing a silicon component only within the particles. These particles give an image quality with improved reproducibility of thin lines, but the image quality does not fully meet those demands.

Furthermore, the magnetite particles proposed by these publications are poor in flowability, and the packing density of the powder becomes too high because of vibrations during transportation, and so forth. This poses the problem of considerably lowering the operating efficiency for production of a toner.

Japanese Laid-Open Patent Publication No. 139544/79 proposes coating the surface of magnetite particles with a silicon component to improve the electrical resistance. This step improves the operating efficiency, but fails to make residual magnetization well balanced, and proves insufficient to provide flowability. The presence of the silicon component on the surface, moreover, leads to high hygroscopicity, in particular.

Japanese Laid-Open Patent Publication No. 213620/93 discloses magnetite particles containing a silicon component inside and on the surface thereof, and having well balanced residual magnetization, satisfactory flowability, and high electrical resistance.

These particles, however, involve the problem that the silicon component on the surface absorbs moisture, although an image quality with improved thin line reproducibility is obtained.

Japanese Laid-Open Patent Publication No. 170325/92 proposes producing magnetite particles having a high coercive force and a high residual magnetization by heating Si- and Al-containing particles in an oxidizing atmosphere, and then heating the particles in a reducing atmosphere.

This method, however, involves oxidation, followed by reduction, in an attempt to obtain a high coercive force and a high residual magnetization. The purpose to be attained thereby is different from the objective that the magnetic particles of the present invention are intended to achieve. The manufacturing method is also different between this publication and the present invention.

Japanese Laid-Open Patent Publication No. 124502/86 puts forward a method of treating the surface of a metallic powder with a fluoride in order to prevent the oxidation of the metallic powder. With this method, however, the material to be coated is metallic powder, and the coating is intended for protection from oxidation. The material to be treated and the purpose to be attained differ from those for the magnetic fine particles of the present invention.

The present invention has been accomplished to solve the above-described problems with the prior art. Its challenge is to provide magnetite particles having low residual magnetization, and excellent in operating efficiency, flowability and environmental resistance, without lowering electrical resistance compared with the current standard. Another challenge is to provide a process for producing the magnetite particles.

SUMMARY OF THE INVENTION

We, the inventors of the present invention, have conducted in-depth studies to solve the above-described problems. As a result, we have found that those problems can be solved by incorporating a silicon component inside magnetite particles, and having a silicon component, especially, a fine silicon component, exposed on the surface of the particles, and then heat-treating the particles in an inert gas. This finding has led us to accomplish the present invention.

First magnetite particles of the present invention based on the above finding contain a silicon component inside; have the silicon component exposed on the surface in a proportion of 0.05 to 2.0% by weight expressed in terms of silicon; have improved moisture resistance as indicated by moisture content (% by weight) of magnetite, measured under high-temperature, high-humidity conditions, and given by the equation (1)

$$\text{moisture content (\% by weight)} \leq 0.5 + A/2 \qquad (1),$$

where A represents the amount (% by weight) of presence of the silicon component, expressed in terms of silicon, contained in magnetite, i.e., the total amount (% by weight) of silicon in magnetite, provided that $0.3 \leq A \leq 3.0$;

have an electrical resistance of $1 \times 10^3$ Ω·cm or more; and have a degree of aggregation of 40 or less.

The first magnetite particles are characterized in that the specific surface area (m²/g) of the magnetite particles by the BET method is given by the equation (2)

$$\text{BET value (m}^2\text{/g)} = [6/(\text{particle size (μm)} \times 5.2)] + C \quad (2),$$

and when the amount (% by weight) of presence of the silicon component exposed on the surface, expressed in terms of silicon, with respect to the magnetite particles is designated as B, the relationship $C/B \geq 15$ is satisfied.

Second magnetite particles pertinent to the present invention are characterized by being the first magnetite particles whose surface is coated with a fluorine component, other than an organic compound, in an amount of 0.01 to 1.0% by weight expressed in terms of fluorine.

A process for producing the magnetite particles, another aspect of the present invention, comprises adding a silicon component to a solution consisting essentially of a ferrous salt; mixing 1.0 to 1.1 equivalents, based on the iron, of an alkali with the solution; then oxidizing the mixture while maintaining its pH at 7 to 10; replenishing additional iron, corresponding to 0.9 to 1.2 equivalents relative to the initial alkali, during the reaction; then continuing the oxidation reaction while maintaining the mixture at a pH of 6 to 10; and heat-treating magnetite particles, obtained by the oxidation reaction, at a temperature in the range of 200° to 700° C. in an inert gas or a fluorine-derived gas.

The moisture content referred to in the present invention is the content of moisture in magnetite determined at 200° C. by the Karl Fischer technique.

The high-temperature, high-humidity conditions refer to the conditions 35° C., 85% and 4 hours that were used in the test.

PREFERRED EMBODIMENTS OF THE INVENTION

Embodiments of the present invention will now be described in detail.

The present invention obtains magnetite particles by incorporating a silicon component into both of the inside and the surface of particles, while controlling the amount of presence of the silicon component (expressed in terms of silicon), particularly that exposed on the surface; and heat-treating the resulting particles in an inert gas or a fluorine-derived gas.

The so obtained magnetite particles improve in the properties, such as electrical resistance, residual magnetization and flowability, in a well balanced manner. These particles also have excellent environmental resistance, and prove preferred when put mainly to uses, such as starting powder in magnetic toners for electrostatic copying, and black pigment powder for paints.

That is, the magnetite particles of the present invention are characterized in that they contain a silicon component inside, have the silicon component, especially fine silicon component, exposed on the surface, and have undergone heat treatment in an inert gas.

As described above, the magnetite particles of the present invention require that the silicon component be present inside and on the surface of magnetite particles before heat treatment. Thus, if the silicon component is not exposed on the surface even when the silicon component exists inside the magnetite particles, the particles will have poor flowability.

If the silicon component present is only the one exposed on the surface of the magnetite particles, on the other hand, the residual magnetization will be high, and the flowability will also be insufficient.

The silicon component referred to herein is an inorganic compound consisting essentially of silicon or silicon oxide.

In the present invention, the amount of presence of the silicon component exposed on the surface of the magnetite particles (hereinafter referred to as the surface exposed silicon component) relative to the magnetite particles is preferably 0.05 to 2.0% by weight expressed in terms of silicon (hereinafter, the amounts of presence of the silicon component are all the amounts expressed in terms of silicon). The total amount of the silicon component is preferably 0.3 to 3.0% by weight.

If the amount of presence of the surface exposed silicon component is less than 0.05% by weight, the effect of improving the flowability will tend to be low. If the amount of presence of the surface exposed silicon component exceeds 2.0% by weight, on the other hand, satisfactory properties will result, but the filter cloth may be clogged during washing with water. This is undesirable because of low operating efficiency.

In detail, the production of magnetite particles requires a water-washing step to remove alkali salts, such as sodium or potassium salts, formed as by-products at the time of synthesis. If the amount of presence of the surface exposed silicon component is large during this step, clogging of the filter cloth will occur, causing a decrease in operating efficiency.

If the total amount of the silicon component is less than 0.3% by weight, there will be a tendency toward a weak effect in achieving a good balance in the properties. If this amount exceeds 3.0% by weight, by contrast, the saturation magnetization will tend to decrease. Both these phenomena are undesirable.

The excess amount of presence of the silicon component would also increase the consumption of silicon, representing poor economy.

The amount of presence of the surface exposed silicon component referred to here is the amount determined by the following analytical method:

0.900 Gram of a sample is weighed, and 25 ml of a 1N solution of NaOH is added. The mixture is heated at 45° C. with stirring to dissolve the silicon on the surface of the particles.

The insolubles are filtered off, and then the solution is made into 125 ml with the addition of pure water. Silicon contained in the solution is determined by inductively coupled plasma atomic emission spectrochemical analysis (hereinafter referred to as ICP analysis).

Surface exposed silicon component (% by weight)={[Silicon (g/l) contained in the solution×125/1,000]/0.900 (g)}×100

The total amount of Si is determined by ICP analysis using a sample dissolved in a salt-hydrofluoric acid solution.

In the present invention, the preferred degree of agglomeration is 40 or less. If the degree of aggregation is as high as more than 40, the aggregates are liable to stick to each other, making the flowability poor.

The magnetite particles of the present invention need to have the silicon component present both within and on the surface of the magnetite particles as described earlier.

The applicant of the present application already proposed, and technically established, the above-described analytical method for distinguishing between the silicon component exposed on the surface of magnetite particles and the silicon component present within the particles (Japanese Laid-Open Patent Publication No. 213620/93). The applicant has heat-treated the magnetite particles, found by the analytical method, in an inert gas to accomplish the present invention.

In the present invention, it is preferred from the viewpoint of the properties that the ratio of the amount of presence of the surface exposed silicon component, (B), to the total content of the silicon component, (A, expressed in terms of silicon), (B/A), in the magnetite particles lies within the range of from 0.03 to 0.7, preferably, from 0.1 to 0.6. Choice from this range should be made so that flowability is well balanced against the desired particle size and residual magnetization.

The magnetite particles of the present invention also require that their electrical resistance be $1.0 \times 10^3$ ($\Omega \cdot cm$) or more, and their specific surface area by the BET method be given by the equation (2)

$$BET\ (m^2/g) = [6/(\text{particle size } (\mu m) \times 5.2)] + C \qquad (2),$$

and that when the amount (% by weight) of presence of the silicon component, expressed in terms of silicon, exposed on the surface with respect to the magnetite particles is designated as B, the relationship $C/B \geq 15$ be satisfied.

The magnetite particles usually have an electrical resistance of about $1 \times 10^3$ ($\Omega \cdot cm$). A higher electrical resistance than this electrical resistance is preferred for a magnetic toner. A lower electrical resistance than that would tend to pose difficulty in retaining the amount of electric charge required of a magnetic toner.

As for the BET value, if the magnetite particles are in the relationship $C/B < 15$, the electrical resistance will not become high enough to withstand a tendency toward decreasing electrical resistance during heat treatment for imparting environmental resistance. As a result, the electrical resistance will fall below $1.0 \times 10^3$ ($\Omega \cdot cm$). In addition, flowability will also decline.

So far, a particulate powder having excellent dispersibility has generally been required to have a small specific surface area relative to the particle size, and have a low oil absorption. The magnetite particles relevant to the present invention have a high roughness factor of the particle, surface, so that they have a large specific surface area relative to the particle size, and a high oil absorption.

The magnetite particles of the present invention have silicon on the surface of the powder. Thus, they are easily wettable with a resin, and so may contribute to improved dispersibility.

<Heat treatment in an inert gas>

Next, the heat treatment of the magnetite particles in an inert gas will be described.

Magnetite particles having a silicon component inside and on the surface have been available because of excellent dispersibility and flowability. Owing to the hygroscopicity of the silicon component, however, they have involved the drawback of absorbing moisture in the air and increasing in the moisture content.

Heat treatment of the resulting magnetite particles in an inert gas, as in the present invention, lowers the hygroscopic properties for unknown reasons. Thus, the above drawback is eliminated, and the dispersibility increased.

One of the reasons is supposed to be that the hydroxyl groups of the silicon component present within and exposed on the surface of the magnetite particles are removed by heat treatment.

As a result of the above heat treatment of the magnetite particles in an inert gas, we have found that the moisture content (% by weight) of magnetite particles determined under high-temperature, high-humidity conditions decreases to a half or less. We have also found that when the amount (% by weight) of presence of the silicon component, expressed in terms of silicon, contained in magnetite (i.e., the total amount of silicon in magnetite) is designated as A, the moisture content of magnetite (% by weight; at 200° C. by the Karl Fischer technique) is expressed by the equation (1)

$$\text{moisture content (\% by weight)} \leq 0.5 + A/2 \qquad (1)$$

provided that $0.3 \leq A \leq 3.0$.

In other words, we have found a marked decrease in moisture content, meaning an improvement in moisture resistance. The value 0.5% by weight in this equation is a value resulting even when no silicon is contained in magnetite.

The reason why the inert gas is used is that the use of an oxidizing gas would result in the oxidation of the magnetite particles as described in Japanese Laid-Open Patent Publication No. 170325/92, and the oxidation would be accompanied by a decrease in saturation magnetization.

The inert gas in the present invention may be any inert gas, such as $N_2$ or Ar, with no restriction imposed thereon.

The heat treatment temperature is preferably 200 to 700° C. A temperature of lower than 200° C. would produce a low effect of improving the moisture content, while a temperature above 700° C. is not preferred from the commercial point of view.

As noted above, the moisture content of the magnetic powder has decreased, and is clearly lowered even in a high-temperature, high-humidity environment. Thus, magnetite having excellent flowability, an electrical resistance of $1.0 \times 10^3$ $\Omega \cdot cm$ or more, well balanced residual magnetization, and satisfactory environmental resistance has been invented. Furthermore, the heat treatment in the inert gas has increased saturation magnetization and increased the amount of a negative charge.

<Heat treatment in a fluorine-derived gas>

The above-described heat treatment has been performed in an inert gas. The present invention further obtains magnetite particles coated with a fluorine component by performing the heat treatment of the resulting magnetite particles in a fluorine-derived gas. By this treatment in the fluorine-derived gas, the invention provides magnetite particles having moisture resistance, as well as a small specific surface area and a low oil absorption for excellent dispersibility.

According to the present invention, the amount of presence of the fluorine component coated on the surface of the magnetite particles is preferably 0.01 to 1% by weight.

If the amount of presence of the surface-coating fluorine component is more than 1% by weight, there will be a decrease in saturation magnetization, an undesirable phenomenon. If this amount is less than 0.01% by weight, on the other hand, dispersion after improvement of the specific surface area may be adversely affected.

In detail, if the amount of presence of the fluorine component is less than 0.01% by weight, particles not heat-treated in the fluorine-derived gas of the present invention have a large roughness factor after improvement of the specific surface area. This results in a large surface of contact with the outside, presenting a potential cause of high hygroscopicity. In the absence of the fluorine component, therefore, some roughness factor needs to be retained on the surface from the viewpoints of flowability and electrical resistance. By coating the particles with the fluorine-derived component in the above range (0.01 to 1% by weight), however, it becomes possible to maintain the flowability and electrical resistance and achieve a further improvement in the moisture resistance, while lowering the roughness factor further.

The relationship between the treatment with the fluorine-derived gas and the treatment with the inert gas will be described below.

The inert gas treatment, as described above, lowers hygroscopicity. However, the BET value of equation (2) (some roughness factor) should be retained to maintain flowability and electrical resistance.

The fluorine-derived gas treatment, unlike the inert gas treatment, can maintain flowability and electrical resistance in the presence of coating with the fluorine component, even if the BET value is not reached.

With the fluorine-derived gas treatment, even when the amount of presence of the surface-coating fluorine component is less than 0.01%, the fluorine-derived gas is introduced along with the inert gas. If the inert gas simultaneously introduced fulfills the BET value of equation (2), the effect of the inert gas treatment is exhibited, so that excellent flowability and electrical resistance can be maintained.

Japanese Laid-Open Patent Publication No. 213620/93 proposes particles having a large specific surface area with a large roughness factor of the particle surface, and a high oil absorption. These particles, however, have silicon on the surface, which contributes to improved dispersibility. They also have a well balanced residual magnetization, good flowability, and high electrical resistance. Because of these properties, however, the particles increase in the area of contact with the outside, deteriorating the moisture resistance.

The magnetite particles of the present invention avoid these drawbacks by heat treatment in a fluorine-derived gas for surface coating.

The fluorine-derived gas may be fluorine gas, or a mixture of fluorine gas and a non-oxidizing gas. Alternatively, the magnetite particles may be mixed with a fluorine-derived compound, followed by heat treatment in a non-oxidizing gas.

The fluorine-derived compound may be hydrogen fluoride, hydrofluoric acid, a hydrogen fluoride-containing compound such as $NH_4F$, $NH_4HF_2$, $KHF_2$ or $NaHF_2$, or a fluoride such as bromine fluoride, iodine fluoride or boron fluoride.

The reason why the non-oxidizing gas is used as the carrier gas is that the use of an oxidizing gas would result in the oxidation of the magnetite particles as stated previously, and the oxidation would be accompanied by a decrease in saturation magnetization.

The non-oxidizing gas may be any non-oxidizing gas, such as $N_2$, Ar or ammonia, with no restriction imposed thereon.

The heat treatment temperature is preferably 200° to 700° C., as in the treatment with the inert gas. A temperature of lower than 200° C. would produce a low effect of improving the moisture content, while a temperature above 700° C. is not preferred from the commercial point of view.

When the surface of the magnetite particles is coated with the fluorine component, the hydroxyl groups of the silicon component inside and surface-exposed on the particles, and the most superficial silicon component may be substituted and removed by heat treatment using fluorine, although the exact mechanism of action is unknown.

In the presence of the fluorine-derived component on the surface, moreover, the roughness factor on the surface was decreased. The coating effect of the fluorine component, however, was able to supplement the flowability and resistance while attaining the intended objects of the present invention.

The silicon component still remained on the surface, and coupled with the surface coating effect of the fluorine component, did not eliminate flowability.

Furthermore, the most superficial silicon in the silicon coating of the magnetite particles was removed. Consequently, the roughness factor decreased, the specific surface area became small, the moisture resistance was improved, and the excellent dispersibility resulted from the low specific surface area and the low oil absorption.

<Process for production>

Next, a preferred process for production according to the present invention will be described.

A silicon component is added to a solution consisting essentially of a ferrous salt. The preferred ferrous salt is ferrous sulfate, and the preferred silicon component is a solution containing a silicon colloid prepared from a silicic acid compound.

Then, the mixture is mixed with 1.0 to 1.1 equivalents, based on the ferrous ions, of an alkali to form ferrous hydroxide.

An oxygen-containing gas, preferably, air, is blown into the ferrous hydroxide solution, followed by performing the oxidation reaction at 60° to 100° C., preferably 80° to 90° C., to form seed crystals. The amount of this oxidation reaction is controlled by analyzing the amount of the unreacted ferrous hydroxide, and breathing the reactor, or adjusting the amount of the oxygen-containing gas, each control method being carried out during the reaction. In this oxidation reaction, it is vital that the pH be maintained at 7 to 10.

When the amount of seed crystals formed reaches 1 to 30%, preferably, 2 to 10%, based on the total amount of oxidation, a deficiency of iron in an amount of 0.9 to 1.2 equivalents, preferably 1.05 to 1.15 equivalents, based on the initial alkali, is added during the oxidation reaction.

The iron used here is desirably in the form of a solution containing a ferrous salt such as ferrous sulfate.

The oxidation reaction is continued with the pH being maintained at 6 to 10, preferably 6 to 9, under the same conditions as described above, to form particles. Then, the particles are washed, filtered, dried and ground by the customary methods to obtain magnetite particles.

In the present invention, pH during the oxidation reaction is preferably adjusted to 6 to 10, as described earlier. This is because when the pH during the oxidation reaction is higher than the neutral range, silicon is taken up into the inside of magnetite particles; whereas when it is lower than the neutral range, silicon is scarcely incorporated inside the particles, and can be precipitated on the surface of the particles.

Our observation of the shape of particles in the course of the oxidation reaction has shown that the seed crystals formed by the initial reaction are unshaped, but in the latter-half of the reaction in the neutral to weakly alkaline range (pH 6 to 9), magnetite particles are covered with fine particles containing the silicon component, growing into particles having very large irregularities on the surface of the particles. Since fine particles containing the silicon component are thus present on the surface of the particles, the resulting particles are high in both the oil absorption and the BET surface area.

That is, if the particles are in the original spherical shape, the BET value ($m^2/g$) must be obtained from the equation (3)

indicated below. However, the particles before heat treatment for production of magnetite particles of the present invention have the BET value of the equation (3) plus C (C/B ≧ 15, B=the amount of presence of the surface exposed silicon component (% by weight) expressed in terms of silicon).

$$\text{BET } (m^2/g) \; 6/(\text{particle size } (\mu m) \times 5.2) \tag{3}$$

In the present invention, the magnetite particles after steps of formation and washing with water are ground during or after drying. Thereby, magnetite particles having better flowability and operating efficiency can be obtained.

The resulting magnetite particles are placed in a cylindrical furnace, and $N_2$ gas is flowed therethrough. The flow rate is not less than one enough to keep the inside of the cylindrical furnace at a positive pressure, namely, to prevent the entrance of air from the outside.

After the system is heated to the desired temperature (200° to 700°), it is held at this temperature for a certain period of time.

The holding time varies with the size and capability of the apparatus, or the amount of the material added. A sufficient holding time is at least the period of time after which the magnetite particles added reach, as a whole, the desired temperature.

Then, the particles are cooled and subjected to grinding, to obtain magnetite particles having the aforementioned properties.

EXAMPLES

The effects of the present invention will be described by preferred Examples with reference to Comparative Examples.

Example 1

1.005 Grams of sodium silicate with an $SiO_2$ grade of 28% was taken, pH-adjusted, and added to 57 liters of an aqueous solution of ferrous sulfate containing 2.4 mols/l of $Fe^{2+}$.

65 Liters of a 4.3N aqueous solution of NaOH and the aqueous solution of ferrous sulfate containing the silicon component were mixed. Air in an amount of 40 liters/min was blown into the mixture maintained at 80° C. to form seed crystals in 30 minutes.

Then, 6.5 liters of an aqueous solution of ferrous sulfate having the same composition as the one for formation of the seed crystals were added to an iron hydroxide slurry containing the seed crystalline particles. Air in an amount of 40 liters/min was blown into the mixture held at a temperature of 80° C. to proceed with the oxidation reaction. When a decrease in pH was detected in the course of the reaction, a 12.5N aqueous solution of NaOH was added. With a pH of 8 to 10 being maintained, the reaction was performed and completed in 6 hours. The resulting particles were washed, filtered, dried and ground by the customary methods.

The so obtained magnetite particles were measured for the amount of presence of the surface exposed silicon component (expressed in terms of silicon), particle size, electrical resistance, residual magnetization, amount of charge, flowability and oil absorption. The results are shown in Table 1.

The amount of presence of the surface exposed silicon component was measured by the aforementioned analytical method. The particle size, electrical resistance, etc. were measured by the following methods.

[Methods of measurement]

(1) Particle size

The diameters of the particles were measured from a transmission electron micrograph (X30,000), and the average of the particle diameters was taken as the particle size.

(2) Electrical resistance 10 grams of a sample were placed in a holder, and molded into a 25 mm$\phi$ tablet under a pressure of 600 kg/cm$^2$. An electrode was attached to the tablet, whose electrical resistance was measured at a pressure of 150 kg/cm$^2$. The electrical resistance of the magnetite particles was calculated from the thickness, cross-sectional area and electrical resistance of the sample used in the measurement.

(3) Residual magnetization ($\sigma_r$)

The residual magnetization was measured in an applied magnetic field of 10 KOe by means of a vibration sample type magnetometer VSM-P7 (Toei Industries). $\sigma_r$ in the range of 5 to 7 emu/g was designated as "medium", a higher value of $\sigma_r$ than this range was designated as "high", and a lower value of $\sigma_r$ than this range was designated as "low".

(4) Flowability

The angle of repose and the degree of aggregation were measured using a powder tester (HOSOKAWA MICRON CORP.). An angle of repose of 40 degrees or less was designated as "small", and an angle of repose of 41 degrees or more as "large". Powder with a smaller angle of repose and a lower degree of aggregation was assessed as better in flowability.

(5) Amount of charge

The amount of charge was determined using an iron powder carrier by blow-off method.

(6) Oil absorption

Measured by JIS K 5101. The procedure for measurement by JIS K 5101 is summarized as follows:

A predetermined weight of a sample is taken onto a glass sheet. Boiled linseed oil is added dropwise from a burette to the center of the sample, with the mixture kneaded using a spatula after each addition. The procedure of dropwise addition and kneading is repeated, and when the sample becomes a lump, the end point is judged to be reached. The oil absorption is calculated from the following equation:

Oil absorption (ml/100 g) = (Amount of linseed oil (ml) × 100)/Amount of sample (g)

Examples 2 to 6

Magnetite particles were obtained in the same manner as in Example 1, except that the amount of sodium silicate added, the pH during the oxidative growth reaction, and the particle size were varied.

The properties and characteristics of these magnetite particles were measured in the same way as in Example 1. The results are shown in Table 1.

Example 7

Magnetite particles were obtained in the same manner as in Example 2, except that sodium carbonate was used as an alkali, and the shape of the particles was pseudohexahedral.

The properties and characteristics of the magnetite particles were measured in the same way as in Example 1. The results are shown in Table 1.

Example 8

Magnetite particles were obtained in the same manner as in Example 1, except that the pH during the oxidative growth reaction was 10 to 12. No silicon component was present on the surface of these magnetite particles.

500 grams of these magnetite particles containing the silicon component only inside were formed into 100 g/l of a slurry. The slurry continued to be stirred with its temperature kept at 50° C. Then, 2.7 g of sodium silicate with an $SiO_2$ grade of 28% was added, and the mixture was stirred for 30 minutes. Then, 1N $H_2SO_4$ was gradually added to adjust the system to pH 7 in 1 hour and coat the silicon component on the surface of the particles. The resulting particles were washed, filtered, dried and ground by the customary method.

The properties and characteristics of the so obtained magnetite particles were measured in the same way as in Example 1. The results are shown in Table 1.

Example 9

Magnetite particles were obtained in the same manner as in Example 8, except that the amount of sodium silicate added was changed.

The properties and characteristics of these magnetite particles were measured in the same way as in Example 1. The results are shown in Table 1.

Comparative Example 1

Magnetite particles were obtained in the same manner as in Example 2, except that no sodium silicate was added.

The properties and characteristics of these magnetite particles were measured in the same way as in Example 1. The results are shown in Table 1.

Comparative Example 2

Magnetite particles were obtained in the same manner as in Example 1, except that the pH during the oxidative growth reaction was 10 to 12. No silicon component was present on the surface of these magnetite particles.

Comparative Example 3

The surface of the magnetite particles obtained in Comparative Example 1 was coated with the silicon component in accordance with the coating method of Example 9.

The properties and characteristics of these magnetite particles were measured in the same way as in Example 1. The results are shown in Table 1.

Comparative Example 4

In accordance with the method described in Japanese Laid-Open Patent Publication No. 139544/79, a dilution (about 1:100) of 1 g silicone oil with an organic solvent was added to 100 g of the sample of Comparative Example 1. After stirring, the organic solvent was evaporated to obtain magnetite particles coated on the surface with the silicon component.

The properties and characteristics of these magnetite particles were measured in the same way as in Example 1. The results are shown in Table 1.

Comparative Example 5

Magnetite particles containing the silicon component only inside were obtained in accordance with the method described in Japanese Laid-Open Patent Publication No. 155223/86.

That is, to an aqueous solution of ferrous sulfate prepared beforehand, a solution of NaOH (0.95 equivalent based on $Fe^{2+}$) containing sodium silicate was added to form an aqueous solution of a ferrous salt containing $Fe(OH)_2$. Air was blown into this solution to form an aqueous solution of a ferrous salt containing magnetite particles. A solution of NaOH was further added, and air was blown into the system at a pH of 11.8 to produce the above magnetite particles containing the silicon component only inside.

The properties and characteristics of these magnetite particles were measured in the same way as in Example 1. The results are shown in Table 1.

TABLE 1

| | | Si content (% by weight based on $Fe_3O_4$) | | | | | | | | | Flowability | | |
|---|---|---|---|---|---|---|---|---|---|---|---|---|---|
| | | Surface | | | | | | | Electrical | | | | |
| | pH during oxidative growth reaction | exposed Si content (1) | Total Si content (2) | Inside Si content (2)-(1) | Particle size (μm) | BET ($m^2/g$) | Oil absorption (ml/100 g) | Residual magnetization | resistance (Ω · cm) | Amount of charge (μc/g) | Angle of repose | Degree of agglomeration | Evaluation |
| Ex. 1 | 8–10 | 0.20 | 1.07 | 0.87 | 0.23 | 19 | 23 | low | $5 \times 10^5$ | −37 | small | 14 | ○ |
| Ex. 2 | 6–8 | 0.56 | 1.24 | 0.68 | 0.24 | 26 | 23 | low | $9 \times 10^5$ | −60 | small | 10 | ○ |
| Ex. 3 | 6–8 | 1.23 | 2.20 | 0.97 | 0.29 | 35 | 32 | low | $3 \times 10^6$ | −83 | small | 10 | ○ |
| Ex. 4 | 6–8 | 0.43 | 1.03 | 0.60 | 0.18 | 20 | 24 | medium | $4 \times 10^5$ | −56 | small | 11 | ○ |
| Ex. 5 | 8–10 | 0.05 | 0.93 | 0.88 | 0.19 | 15 | 22 | medium | $9 \times 10^4$ | −39 | small | 19 | ○ |
| Ex. 6 | 6–8 | 0.39 | 0.88 | 0.49 | 0.18 | 23 | 22 | medium | $3 \times 10^5$ | −56 | small | 10 | ○ |
| Ex. 7 | 8–10 | 0.60 | 1.18 | 0.58 | 0.16 | 29 | 27 | medium | $2 \times 10^5$ | −57 | small | 10 | ○ |
| Ex. 8 | 10–12 | 0.10 | 1.06 | 1.03 | 0.21 | 13 | 25 | low | $1 \times 10^4$ | −27 | large | 32 | Δ |
| Ex. 9 | 10–12 | 0.32 | 1.10 | 0.78 | 0.20 | 19 | 26 | low | $2 \times 10^4$ | −43 | large | 33 | Δ |
| C. Ex. 1 | 6–8 | 0 | 0 | 0 | 0.18 | 7 | 20 | high | $2 \times 10^3$ | −12 | large | 47 | X |
| C. Ex. 2 | 10–12 | 0 | 1.05 | 1.05 | 0.21 | 6 | 28 | medium | $3 \times 10^3$ | −19 | large | 46 | X |
| C. Ex. 3 | 6–8 | 0.30 | 0.30 | 0 | 0.21 | 9 | 22 | high | $4 \times 10^3$ | −25 | large | 38 | Δ |
| C. Ex. 4 | 6–8 | 0.15 | 0.15 | 0 | 0.20 | 7 | 21 | high | $2 \times 10^3$ | −27 | small | 37 | Δ |
| C. Ex. 5 | 6–7 | 0 | 0.14 | 0.14 | 0.19 | 7 | 16 | medium | $1 \times 10^3$ | −15 | small | 60 | X |

The properties and characteristics of these magnetite particles were measured in the same way as in Example 1. The results are shown in Table 1.

As the results of Table 1 indicate, the magnetite particles of Examples 1 to 7 obtained by the process for production according to the present invention were satisfactory in residual magnetization and all parameters of flowability.

Examples 8 and 9 show the silicon-containing magnetite particles coated on the surface with the silicon component by immersion. These magnetite particles were less satisfactory in the increase in electrical resistance as well as in flowability than the magnetite particles of Examples 1 to 7, but they were within the permissible ranges.

In contrast, Comparative Example 1 was free from the silicon component. Thus, the residual magnetization was high for the particle size, and the flowability was inferior.

Comparative Example 2 contained the silicon component only inside the particles. Thus, the residual magnetization was low for the particle size, but the flowability was poor.

Comparative Examples 3 and 4 contained the silicon component only on the surface of the particles. Thus, the residual magnetization was high for the particle size.

Comparative Example 5 was inferior in flowability.

All of the comparative examples were minimally effective in increasing the electric resistance.

As discussed above, the presence of the silicon component inside and on the surface of the particles made it possible to produce magnetite particles having satisfactory flowability and operating efficiency, low residual magnetization for the particle size, and increased electrical resistance.

Examples 11 and 12

The same treatment as in Example 10 was performed, except that the products of Examples 5 and 6 were used.

Example 13

The same treatment as in Example 10 was performed, except that the product of Example 2 was used and the heat treatment temperature was 300° C.

Comparative Examples 6 and 7

The same treatment as in Example 10 was performed, except that the products of Comparative Examples 3 and 4 were used.

The electrical resistances, saturation magnetizations, amounts of charge, and reflectances after heat treatment in Examples 10 to 13 and Comparative Examples 6 and 7 are shown in Table 2.

TABLE 2

|  | Electrical resistance ($\Omega \cdot cm$) | Saturation magnetization (emu/g) | Amount of charge ($\mu c/g$) | Oil absorption (ml/100 g) | BET | Surface exposed Si content | Reflectance | Saturation magnetization before heat treatment (emu/g) | Reflectance before heat treatment |  |
| --- | --- | --- | --- | --- | --- | --- | --- | --- | --- | --- |
| Ex. 10 | $7 \times 10^3$ | 82.4 | −92 | 21 | 22 | 0.62 | 84 | 79.6 | 80 | 500° C. heat treatment of Ex. 2 in inert gas |
| Ex. 11 | $2 \times 10^3$ | 83.5 | −69 | 21 | 11 | 0.08 | 82 | 80.6 | 78 | 500° C. heat treatment of Ex. 5 in inert gas |
| Ex. 12 | $4 \times 10^3$ | 83.7 | −80 | 20 | 20 | 0.44 | 83 | 81.3 | 80 | 500° C. heat treatment of Ex. 6 in inert gas |
| Ex. 13 | $6 \times 10^4$ | 81.2 | −85 | 21 | 24 | 0.58 | 82 | 79.6 | 80 | 300° C. heat treatment of Ex. 2 in inert gas |
| C. Ex. 6 | $2 \times 10^2$ | 83.1 | −45 | 19 | 6 | 0.31 | 81 | 81.5 | 79 | 500° C. heat treatment of Comp. Ex. 3 in inert gas |
| C. Ex. 7 | $9 \times 10^1$ | 83.4 | −40 | 18 | 5 | 0.15 | 81 | 82.1 | 78 | 500° C. heat treatment of Comp. Ex. 4 in inert gas |

Then, the reflectance was measured to examine the dispersibility.

(7) Dispersibility 1 gram of magnetite and 0.7 g of linseed oil were kneaded by means of a Hoover's muller, and then 4.5 g of clear lacquer were added, followed by kneading the mixture well. The kneaded product was coated onto a glass plate using a 4 mil applicator. After drying, the coating was measured for reflectance at 60° by Murakami's GLOSS METER (GM-3M).

Next, the methods of heat treatment will be described.

The methods of heat treatment are heat treatment in "an inert gas", and heat treatment in "a fluorine-derived gas". Examples 10 to 13 and Comparative Examples 6 and 7 involve heat treatment in the inert gas.

Example 10

The magnetite particles obtained in Example 2 were charged in an amount of 2 kg into a cylindrical furnace of 200 mm in diameter and 790 mm in length. While nitrogen gas was flowing at a rate of 20 liters/min, the system was heated to 500° C., and held at this temperature for 30 minutes. The thus treated product was cooled to room temperature, and ground.

The results of Table 2 show that heat treatment lowered the electrical resistance compared with the initial values, but still the values of electrical resistance were more than $1 \times 10^3$ in Examples 10 to 13, while the values were less than $1 \times 10^3$ in Comparative Examples 6 and 7.

The saturation magnetizations and the amounts of negative charge became more than the initial values.

The flowability was not affected by heat treatment.

The dispersibility improved after heat treatment.

The moisture resistance was examined in the following manner:

Moisture content (% by weight): Karl Fischer technique

Moisture in the magnetite particles at each temperature was evaporated by WATER VAPORIZER VA-05 (Mitsubishi Chemical Ind. Ltd.), and detected by MOISTURE METER CA-03 (MITSUBISHI KASEI Corporation) to determine the moisture content of magnetite.

Environmental conditions

A thermo-hygrostat ("LHL-111", TABAI ESPEC CORP.) was used to maintain a temperature of 35° C. and humidity of 85% for 4 hours. Repeated tests were performed under the conditions described below, with a dryer ("PS-222", TABAI ESPEC CORP.) being set at 150° C. The product was sampled on the occasion of measurement described below, and measured by the above-mentioned method for the moisture content (% by weight) of the magnetite particles. The results are shown in Table 3.

The method of measurement was as follows:

The sample was dried at 150° C., and held under high temperature, high humidity conditions. Then, the first measurement was made (150° C./200° C.).

Then, the sample was further dried at 150° C., and held under high temperature, high humidity conditions, whereafter the second measurement was made (150° C./200° C.).

TABLE 3

|  | 1st measurement (% by weight) | | 2nd measurement (% by weight) | |
| --- | --- | --- | --- | --- |
|  | 150° C. | 200° C. | 150° C. | 200° C. |
| Ex.2 | 1.12 | 1.55 | 1.08 | 1.49 |
| Ex.5 | 1.00 | 1.50 | 0.98 | 1.49 |
| Ex.6 | 0.88 | 1.34 | 0.88 | 1.33 |
| Comp. Ex. 3 | 0.68 | 0.93 | 0.65 | 0.92 |
| Comp. Ex. 4 | 0.63 | 0.87 | 0.61 | 0.84 |
| Ex.10 | 0.65 | 0.72 | 0.58 | 0.62 |
| Ex.11 | 0.35 | 0.42 | 0.38 | 0.46 |
| Ex.12 | 0.30 | 0.35 | 0.32 | 0.39 |
| Ex.13 | 0.55 | 0.64 | 0.53 | 0.58 |
| Comp. Ex.6 | 0.28 | 0.32 | 0.27 | 0.32 |
| Comp. Ex.7 | 0.25 | 0.30 | 0.24 | 0.31 |

The results of Table 3 show that the heat treatment of the magnetite particles in an inert gas successfully lowered the moisture content of magnetite markedly even in a high-temperature, high-humidity environment.

Next, a description will be offered of Examples 14 to 18 and Comparative Examples 8 and 9 using fluorine-derived gas instead of the inert gas as a method of heat treatment.

Example 14

The magnetite particles obtained in Example 2 were mixed with 39 g of $NH_4HF_2$ (1.3% F relative to magnetite). The mixed powder was charged in an amount of 2 kg into a cylindrical furnace of 200 mm in diameter and 790 mm in length. While nitrogen gas was flowing at a rate of 20 liters/min, the system was heated to 500° C., and held at this temperature for 30 minutes. The thus treated product was cooled to room temperature, and ground.

Example 15

The same treatment as in Example 14 was performed, except that the product of Example 6 was used.

Example 16

The same treatment as in Example 14 was performed, except that the product of Example 2 was used and the heat treatment temperature was 300° C.

Example 17

The same treatment as in Example 14 was performed, except that the amount of $NH_4HF_2$ was 78 g (2.7% F relative to magnetite).

Example 18

The same treatment as in Example 14 was performed, except that the amount of $NH_4HF_2$ was 20 g (0.7% F relative to magnetite).

Comparative Examples 8 and 9

The same treatment as in Example 14 was performed, except that the products of Comparative Examples 3 and 4 were used.

The electrical resistances, saturation magnetizations, amounts of charge, and reflectances after heat treatment in Examples 14 to 18 and Comparative Examples 8 and 9 are shown in Table 4.

TABLE 4

|  | Electrical resistance ($\Omega \cdot cm$) | Saturation magnetization (emu/g) | Oil absorption (ml/100 g) | BET ($m^2/g$) | Surface exposed Si content (wt. %) | Total Si content (wt. %) | F content (wt. %) | Reflectance | Saturation magnetization before heat treatment (emu/g) | Reflectance before heat treatment |  |
| --- | --- | --- | --- | --- | --- | --- | --- | --- | --- | --- | --- |
| Ex. 14 | $6 \times 10^3$ | 81.5 | 17 | 11 | 0.44 | 1.00 | 0.45 | 84 | 79.6 | 80 | 500° C. heat treatment of Ex. 2 in F gas (1.3%) |
| Ex. 15 | $5 \times 10^3$ | 83.3 | 17 | 9 | 0.29 | 0.64 | 0.41 | 82 | 81.5 | 79 | 500° C. heat treatment of Ex. 6 in F gas (1.3%) |
| Ex. 16 | $7 \times 10^4$ | 79.7 | 19 | 18 | 0.50 | 1.15 | 0.98 | 83 | 79.6 | 80 | 300° C. heat treatment of Ex. 2 in F gas (1.3%) |
| Ex. 17 | $6 \times 10^3$ | 80.1 | 17 | 8 | 0.14 | 0.67 | 0.72 | 84 | 79.6 | 80 | 500° C. heat treatment of Ex. 2 in F gas (2.7%) |
| Ex. 18 | $5 \times 10^3$ | 82.3 | 18 | 15 | 0.32 | 1.07 | 0.24 | 83 | 81.5 | 79 | 500° C. heat treatment of Ex. 2 in F gas (0.7%) |
| Comp. Ex. 8 | $1 \times 10^2$ | 81.8 | 19 | 8 | 0.14 | 0.15 | 0.72 | 81 | 81.3 | 79 | 500° C. heat treatment of Comp. Ex. 3 in F gas |

TABLE 4-continued

|  | Electrical resistance (Ω · cm) | Saturation magnetization (emu/g) | Oil absorption (ml/100 g) | BET (m²/g) | Surface exposed Si content (wt. %) | Total Si content (wt. %) | F content (wt. %) | Reflectance | Saturation magnetization before heat treatment (emu/g) | Reflectance before heat treatment |  |
|---|---|---|---|---|---|---|---|---|---|---|---|
| Comp. Ex. 9 | 8 × 10¹ | 81.9 | 17 | 7 | 0.06 | 0.06 | 0.97 | 80 | 81.9 | 78 | (1.3%) 500° C. heat treatment of Comp. Ex. 4 in F gas (1.3%) |

Notes:
F gas (1.3%) represents adding NH₄HF₂ so that the feed of F would be 1.3% relative to magnetite.
F gas (2.7%) represents adding NH₄HF₂ so that the feed of F would be 2.7% relative to magnetite.
F gas (0.7%) represents adding NH₄HF₂ so that the feed of F would be 0.7% relative to magnetite.

The results of Table 4 show that the heat treatment in the fluorine-derived gas lowered the electrical resistance compared with the initial values, but still the values of electrical resistance were more than 1×10³ in Examples 14 to 18, while the values were less than 1×10³ in Comparative Examples 8 and 9. Removal of the most superficial silicon resulted in decreases in the specific surface area and the oil absorption.

Example 14 confirmed that the magnetite particles coated with the fluorine-derived component were satisfactory in the flowability and the electrical resistance, even when they did not fulfill the following conditions:

BET value (m²/g) = [6/(particle size (μm) × 5.2)] + C

C/B ≧ 15 (B = the amount of presence of the surface exposed silicon componet (% by weight) expressed in terms of silicon)

The saturation magnetizations became more than before the heat treatment.

The flowability was not affected by the heat treatment in the fluorine-derived gas.

The dispersibility improved after the heat treatment in the fluorine-derived gas.

The moisture resistance was examined by the same procedure as in the case of the inert gas. The results of measurement of the moisture content (% by weight) in the magnetite particles are shown in Table 5.

TABLE 5

|  | 1st measurement (% by weight) | | 2nd measurement (% by weight) | |
|---|---|---|---|---|
|  | 150° C. | 200° C. | 150° C. | 200° C. |
| Ex. 2 | 1.12 | 1.55 | 1.08 | 1.49 |
| Ex. 6 | 0.88 | 1.34 | 0.88 | 1.33 |
| Comp. Ex. 3 | 0.68 | 0.93 | 0.65 | 0.92 |
| Comp. Ex. 4 | 0.63 | 0.87 | 0.61 | 0.84 |
| Ex. 14 | 0.24 | 0.32 | 0.31 | 0.43 |
| Ex. 15 | 0.29 | 0.34 | 0.32 | 0.35 |
| Ex. 16 | 0.48 | 0.55 | 0.46 | 0.53 |
| Ex. 17 | 0.24 | 0.30 | 0.24 | 0.32 |
| Ex. 18 | 0.38 | 0.41 | 0.38 | 0.41 |
| Comp. Ex. 8 | 0.30 | 0.34 | 0.27 | 0.32 |

TABLE 5-continued

|  | 1st measurement (% by weight) | | 2nd measurement (% by weight) | |
|---|---|---|---|---|
|  | 150° C. | 200° C. | 150° C. | 200° C. |
| Comp. Ex. 9 | 0.26 | 0.31 | 0.24 | 0.31 |

The results of Table 5 show that the heat treatment of the magnetite particles in a fluorine-derived gas successfully lowered the moisture content of magnetite markedly even in a high-temperature, high-humidity environment.

As described above, the magnetite particles of the present invention had low residual magnetization, satisfactory flowability, markedly decreased moisture content of magnetite, and excellent environmental resistance while retaining higher electrical resistance than a certain level. Furthermore, the invented magnetite particles were preferred for use in a magnetic toner for electrostatic copying.

What is claimed is:

1. Magnetite particles containing a silicon component inside, and having the silicon component exposed on the surface in a proportion of 0.05 to 2.0% by weight expressed in terms of silicon; and having the following properties:

improved moisture resistance, as indicated by moisture content (% by weight) of magnetite, measured under high-temperature, high-humidity conditions, and given by the equation (1)

moisture content (% by weight)≦0.5+A/2  (1), where A represents the amount (% by weight) of presence of the silicon component, expressed in terms of silicon, contained in magnetite, i.e., the total amount (% by weight) of silicon in magnetite, provided that 0.3≦A≦3.0;

an electrical resistance of 1×10³ Ω·cm or more; and a degree of aggregation of 40 or less.

2. Magnetite particles as defined in claim 1, wherein the specific surface area (m²/g) of the magnetite particles by the BET method is given by the equation (2)

BET value (m²/g)=[6/(particle size (μm)×5.2)]+C  (2), and when the amount (% by weight) of presence of the silicon component exposed on the surface, expressed in terms of silicon, with respect to the magnetite particles is designated as B, the relationship C/B≧15 is satisfied.

3. Magnetite particles as defined in claim 1, wherein the surface of the magnetite particles is coated with a fluorine component in an amount of 0.01 to 1.0% by weight expressed in terms of fluorine.

4. A process for producing magnetite particles, which comprises adding a silicon component to a solution consisting essentially of a ferrous salt; mixing 1.0 to 1.1 equivalents, based on the iron, of an alkali with the solution; then oxidizing the mixture while maintaining its pH at 7 to 10; replenishing additional iron, corresponding to 0.9 to 1.2 equivalents relative to the initial alkali, during the reaction; then continuing the oxidation reaction while maintaining the mixture at a pH of 6 to 10; and heat-treating magnetite particles, obtained by washing and drying after the oxidation reaction, at a temperature in the range of 200° to 700° C. in an inert gas or a fluorine-derived gas.

5. The process of claim 4, wherein the heat treatment is effected in a fluorine-derived gas with 0.01 to 1.0% by weight of fluorine on the particle surface.

* * * * *